United States Patent [19]  
Tanguy

[11] 3,926,414  
[45] Dec. 16, 1975

[54] ICE-BOX
[75] Inventor: Pierre Tanguy, Daix, France
[73] Assignee: Etud, Dijon, France
[22] Filed: Jan. 2, 1974
[21] Appl. No.: 429,820

[30] Foreign Application Priority Data
Jan. 4, 1973 France .............. 73.00210

[52] U.S. Cl. .................. 259/108; 62/130; 62/136; 259/DIG. 19
[51] Int. Cl.² ........................................ A23G 9/12
[58] Field of Search ....... 62/136, 130; 259/DIG. 19, 259/108

[56] References Cited
UNITED STATES PATENTS
2,139,576 12/1938 Davis, Jr. .......................... 62/130 X
2,808,706 10/1957 Updegraff ............................. 62/136

Primary Examiner—William E. Wayner
Attorney, Agent, or Firm—Raymond A. Robic; Leo A. Rosetta; Arthur Schwartz

[57] ABSTRACT

The invention relates to an electrical domestic appliance for making ice creams and water ices in a refrigerator. The appliance according to the invention comprises a space between the motor-reducer block and the inner wall of the tank, and openings formed in the flattened edge onto which fits said motor-reducer block so that the cold ambient air is able to circulate freely between the inner wall of the tank and the wall of the motor-reducer block. An aural and/or optical alarm arranged on the power cable or in the plug by which the power cable is connected to the mains indicates that the mixer blades have been removed and/or that the motor has stopped. The alarm is set off by a bimetallic element which is deformable under the action of the heat released by the motor.

7 Claims, 8 Drawing Figures

ICE-BOX

This invention relates to an electrical domestic appliance for making ice creams and water ices in a preserver, refrigerator or freezer. These ice creams or water ices can have two flavours according to the process described in our earlier U.S. application, Ser. No. 292,121 of Sept. 25, 1972.

According to this earlier patent application, it is necessary, following automatic removal of the mixer blades, to withdraw the removable partition separating the two preparations so that they can blend together during freezing. Since the appliance functions inside a refrigerated cabinet, it is necessary, in order to be able to intervene when the blades are removed, to watch the appliance very carefully and, hence, to open the refrigerated cabinet fairly frequently. If the preparation is left to set following removal of the blades without withdrawing the removable partition, the removable partition cannot be removed and, hence, remains trapped in the ice cake even after it has been taken out of its mould.

According to a first aspect of the present invention, the motor-reducer block comprises a microswitch which closes an electrical circuit incorporating an aural or visual alarm placed on the power cable externally of the refrigerated cabinet. This microswitch can also cause the motor to stop automatically by breaking its feed circuit. This microswitch is actuated by the displacement of one of the toothed wheels by which the movement of the motor is transmitted to the driving head. This displacement is due to the reaction of the arm driving the mixer blades which disappears when the blades are removed. However, to prevent the alarm system from being set off when voltage is applied to the motor, and to prevent the motor from being started up, the microswitch has to be temporarily withdrawn from the action of this gear train. This requirement is satisfied by fixing the microswitch to a heat-deformable support.

According to a second aspect of the invention, a space is formed between the motor block and the inner wall of the tank so that the cold air from the refrigerated compartment, in which the appliance is accommodated during mixing, is able to circulate freely, thus facilitating setting of the preparation situated in the inner rim.

The invention is described in more detail in the following with reference to the accompanying drawings, wherein.

Figure 1:
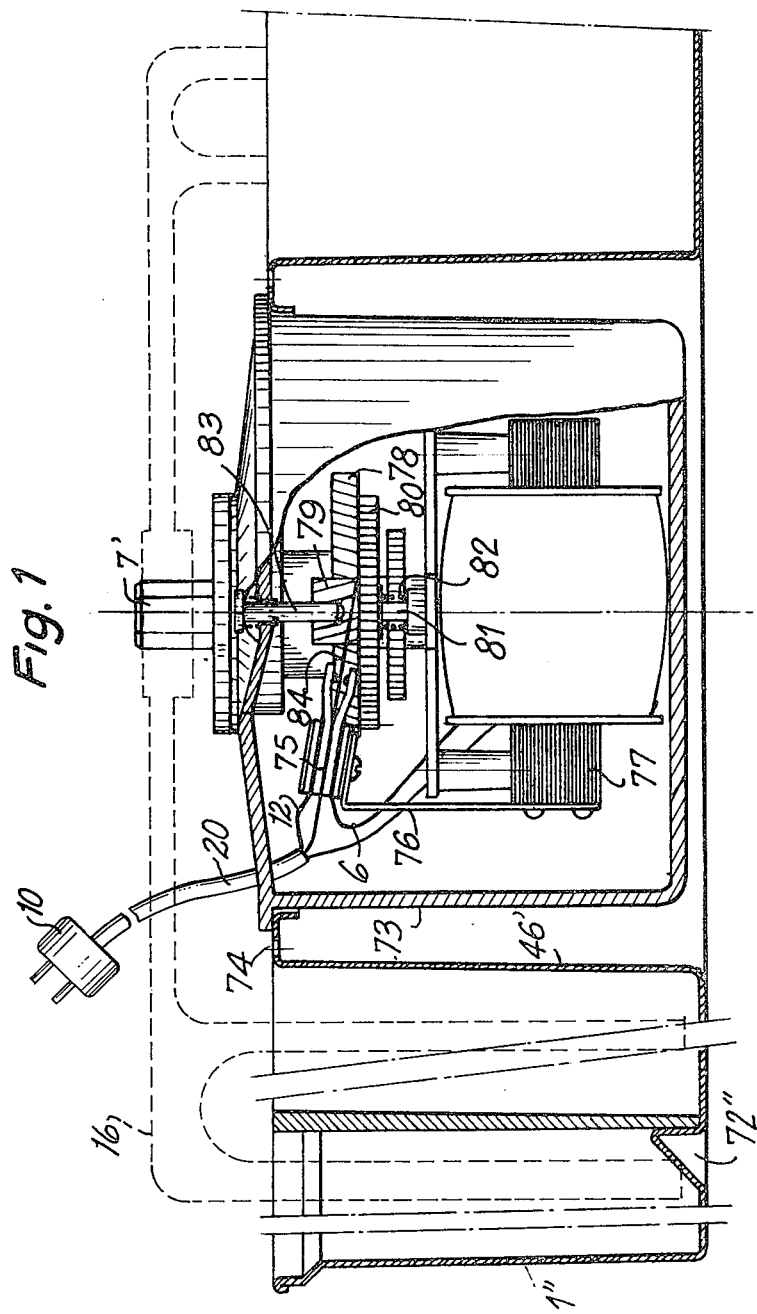
FIG. 1 is a section through the tank equipped with its motor-reducer block.

FIG. 1 shows a tank 1" whose base is formed with a circular groove 72". The inner wall 46' is situated at such a distance from the motor block 73 that the air is able to circulate freely and to escape through the upper openings 74. Experience has shown that, in cases where the appliance functions in a freezer, the cold air reaches the wall 46' when it is situated close to the motor block, as described in the earlier Patent.

In FIG. 1, the motor block is shown partly in section. The microswitch 75 is of the sudden-break, reversing type whose contact 84 normally stays in each of the two end positions, is fixed to the end of a bimetallic strip 76. The other end of this bimetallic strip 76 is fixed to the magnetic circuit 77 of the motor. After, a certain period of operation, the magnetic circuit undergoes an increase in temperature under the hysteresis effect inherent in any motor operating on alternating current. The bimetallic strip 76 fixed to the magnetic circuit also undergoes an increase in temperature by thermal conduction, and bends inwards. The transmission head 7' is coupled to the toothed rim 78 which itself engages with the pinion 79. The pinion 79 is an integral part of the toothed wheel 80. The two toothed wheels 78 and 79 have helical toothing. The assembly 79–80 rotates about a shaft 81 and can be displaced longitudinally on this shaft. It is urged upwards by a spring 82. Other gear wheel trains (not shown) transmit movement from the motor through gears 79 and 80 to gear 78. A pushbutton 83 enables the mobile armature of the microswitch 75 to be pushed into its lower position.

The principal components deccribed above are shown again in FIGS. 2 to 6, but in this case in the form of kinematic diagrams.

Figure 2:
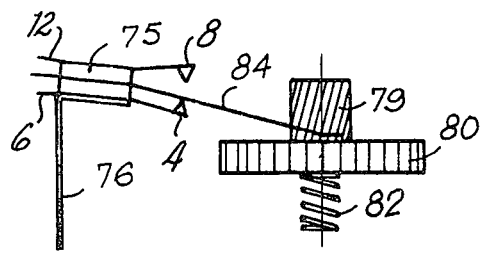
FIGS. 2 and 6 are kinematic diagrams illustrating the mode of operation.
Figure 3:
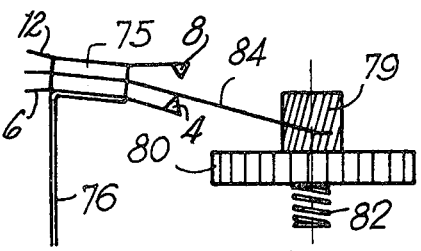

FIG. 2 shows the various components when the appliance is cold and stationary. The mobile armature 84 has been pushed into its lower position by depressing the pushbutton 83 to engage contact 4. Since it is cold, the bimetallic strip 76 remains perfectly straight which determined such a position for the mobile armature 84 that it touches the upper surface of the toothed rim 80 which is held in it upper position under the effect of the spring 82.

When voltage is applied to the motor (FIG. 3) through contact 4 and conductor 6 the driving force of the blades only transmits a weak engaging reaction to the pinion 79. Since the preparations accommodated in the tank are liquid, the force required to rotate the arm is scarcely any higher than that required to rotate the blades in the open air. However, a certain force is necessary. In this case, the engaging reaction produces a resultant normal to the helical teeth of the wheels 78 and 79, one component of which tends to move the pinion 79 downwards. This component is partially compensated by the action of the spring 82. The wheel 80 thus assumes the position illustrated in FIG. 3.

Figure 4:
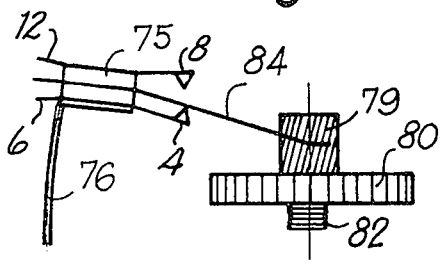

As the preparation thickens and sets, the drive force increases, causing the wheel 80 to be gradually lowered. In the meantime, the magnetic circuit of the motor undergoes an increase in temperature. The bimetallic strip 76 also undergoes an increase in temperature by conduction, resulting in its deformation. This phase is illustrated in FIG. 4.

Figure 5:
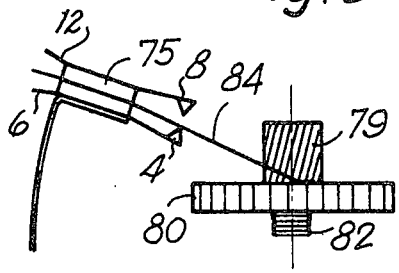
Figure 6:
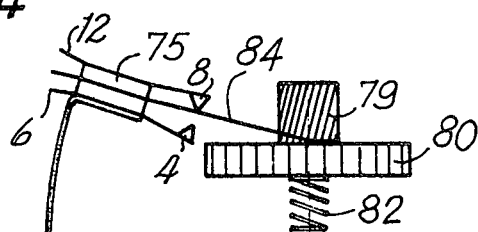

Before the blades, schematically shown in FIG. 1 at 16, are raised, due to the fact that they are immersed in a preparation which is about to be frozen, the force transmitted is at its maximum. The result of this is that the spring 82 is fully compressed. The motor has assumed its operating temperature, so that the bimetallic strip is completely curved (FIG. 5). The exact combination of the increase in the mixing torque on the one hand with the increase in temperature on the other hand enables the mobile armature 84 to remain out of contact with the toothed wheel 80 throughout the entire operation of the appliance.

When the blades are removed, the reaction torque quickly disappears. The wheel 80 under the action of the spring 82 ascends again and pushes the mobile armature 84 of the microswitch upwards to engage contact 8, thus modifying the electrical circuits passing through the microswitch (FIG. 6) to open the circuit to the motor and connect it across the alarm device 10 through conductor 12 which is part of power cable 20.

After a cooling period, the bimetallic strip 76 assumes its original form. Since the microswitch is of the permanent contact type, it remains in the "armature raised" position which prevents the motor from being restarted. To use the appliance again, it is sufficient to depress the armature 84 by means of the pushbutton 83 to return the electrical circuit to the starting position.

Figure 7:
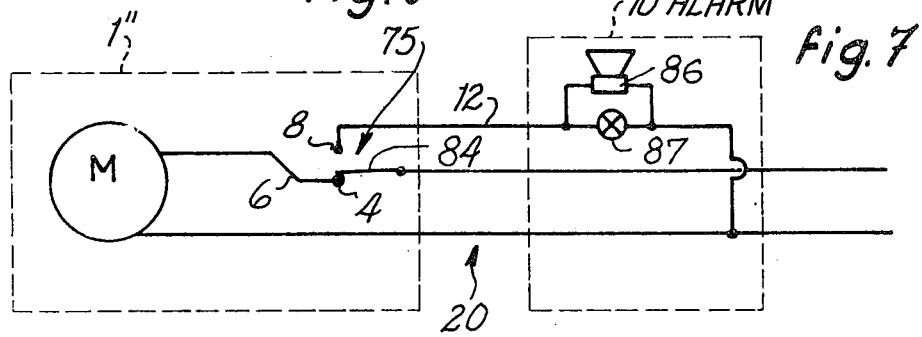
FIGS. 7 and 8 are two circuit diagrams.

The electrical circuit can be designed as shown in FIG. 7. The microswitch 75 shown in its closed position in the motor circuit enables the motor to function as soon as voltage is applied to it.

Figure 8:
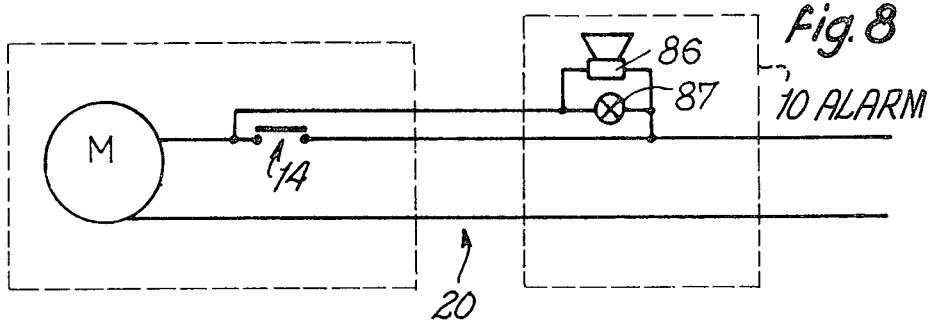

When the blades are removed, the mobile armature interrupts the supply of voltage to the motor and cuts an aural and/or optical alarm system 86 and/or 87 into the circuit. This warning system or alarm 10 is situated on the power cable outside the refrigerated cabinet at a location remote from the tank 1'' and the cabinet so that the appliance can be watched without having to open the cabinet door. FIG. 8 illustrates a modification in which a shunt-type circuit breaker 14 is used in place of a reversing switch. When the circuit breaker 14 is open, the direct circuit to the motor is cut off and in view of the total resistance in the circuit including alarm device 10, the total current flow is insufficient to operate the motor.

In order to reduce the retain price of the casing accomodating the alarm, it may be of advantage to use the actual plug of the power cable by giving it suitable dimensions.

I claim:

1. In an appliance for making water ices and the like having a motor, an electrical circuit for said motor including a power cable extending from said appliance, reduction gearing and retractable mixing blades driven by said motor, the improvement comprising:
   means responsive to retraction of said blades to open said circuit to said motor and connect said circuit to an alarm device, said alarm device being in said power cable and in a position therein remote from said motor whereby it may be positioned externally of the region in which said appliance is located.

2. An appliance as claimed in claim 1, wherein the alarm is incorporated in a plug for connecting the power cable to the mains.

3. An appliance as claimed in claim 1, wherein a heat-deformable bimetallic strip is in intimate contact with a constituent part of the motor which is heated by the magnetic induction effects inherent in motors fed with alternating current and arranged to condition said responsive means.

4. An appliance as claimed in claim 1, wherein a movable pinion of the reduction gearing is displaced under the effect of the reaction torque due to the resistance offered to the mixer blades by the preparation in the course of freezing to actuate said responsive means.

5. An appliance as claimed in claim 4, wherein the displacement of the pinion takes place tangentially of said pinion.

6. An appliance as claimed in claim 4, wherein the displacement of the pinion takes place axially of said pinion by using a helically toothed coupling.

7. An appliance as claimed in claim 3, wherein the mobile armature of a circuit breaker incorporated in the electrical circuit of said alarm device in the motor feed circuit is actuated by either the displacement of said bimetallic element or by the displacement of a gear of said reduction gearing.

* * * * *